(12) United States Patent
Hess et al.

(10) Patent No.: US 9,943,907 B2
(45) Date of Patent: Apr. 17, 2018

(54) APPARATUS AND METHOD FOR GENERATIVE PRODUCTION OF A COMPONENT

(71) Applicant: MTU Aero Engines AG, Munich (DE)

(72) Inventors: Thomas Hess, Munich (DE); Alexander Ladewig, Bad Wiessee (DE); Christian Liebl, Bockhorn (DE); Steffen Schlothauer, Erdweg (DE); Andreas Jakimov, Munich (DE); Georg Schlick, Munich (DE)

(73) Assignee: MTU AERO ENGINES AG, Munich (DE)

( * ) Notice: Subject to any disclaimer, the term of this patent is extended or adjusted under 35 U.S.C. 154(b) by 121 days.

(21) Appl. No.: 14/628,402

(22) Filed: Feb. 23, 2015

(65) Prior Publication Data
US 2015/0246414 A1    Sep. 3, 2015

(30) Foreign Application Priority Data
Feb. 28, 2014   (DE) .................. 10 2014 203 710

(51) Int. Cl.
*B22F 3/10*     (2006.01)
*B29C 64/10*    (2017.01)
(Continued)

(52) U.S. Cl.
CPC .......... *B22F 3/1055* (2013.01); *B29C 64/153* (2017.08); *B29C 64/165* (2017.08); *B29C 64/386* (2017.08); *B22F 2003/1057* (2013.01); *B33Y 10/00* (2014.12); *B33Y 30/00* (2014.12); *B33Y 40/00* (2014.12); *Y02P 10/295* (2015.11)

(58) Field of Classification Search
CPC . B23K 26/345; B23F 3/1055; B29C 67/0077; B29C 67/0081; B29C 67/0088
See application file for complete search history.

(56) References Cited

U.S. PATENT DOCUMENTS

| | | | | |
|---|---|---|---|---|
| 7,847,212 | B2 * | 12/2010 | Renz ................. | B22F 3/003 219/121.61 |
| 2009/0020901 | A1 * | 1/2009 | Schillen ............. | B29C 67/0051 264/31 |

(Continued)

FOREIGN PATENT DOCUMENTS

| | | |
|---|---|---|
| DE | 102012007791 A1 | 10/2013 |
| WO | 2009013751 A2 | 1/2009 |
| WO | 2012045660 A1 | 4/2012 |

*Primary Examiner* — Brian Jennison
(74) *Attorney, Agent, or Firm* — Barlow, Josephs & Holmes, Ltd.

(57) ABSTRACT

An apparatus and method for the generative production of a component includes a movably dispensing structure for the disposal of a starting material layer; a bonding device, such as a laser, for the local bonding of this starting material layer to a cross section of the component being produced; a platform for supporting the component being produced, which can be displaced counter to a direction of layer buildup in a motor-driven manner; a position sensing device for sensing a position or change in position, such as vibration, of the platform in the direction of layer buildup with the capability of sensing interference as to whether the movement of the dispensing structure is not free of interference on the basis of the sensed position or change in position.

15 Claims, 1 Drawing Sheet

(51) Int. Cl.
*B23K 26/34* (2014.01)
*B22F 3/105* (2006.01)
*B29C 64/153* (2017.01)
*B29C 64/165* (2017.01)
*B29C 64/386* (2017.01)
*B33Y 10/00* (2015.01)
*B33Y 30/00* (2015.01)
*B33Y 40/00* (2015.01)

(56) References Cited

U.S. PATENT DOCUMENTS

| | | | |
|---|---|---|---|
| 2009/0210084 A1* | 8/2009 | Eshed | B29C 67/0059 700/110 |
| 2010/0191360 A1* | 7/2010 | Napadensky | B29C 67/0059 700/98 |
| 2012/0298886 A1* | 11/2012 | Petersen | G03F 7/0037 250/492.1 |

* cited by examiner

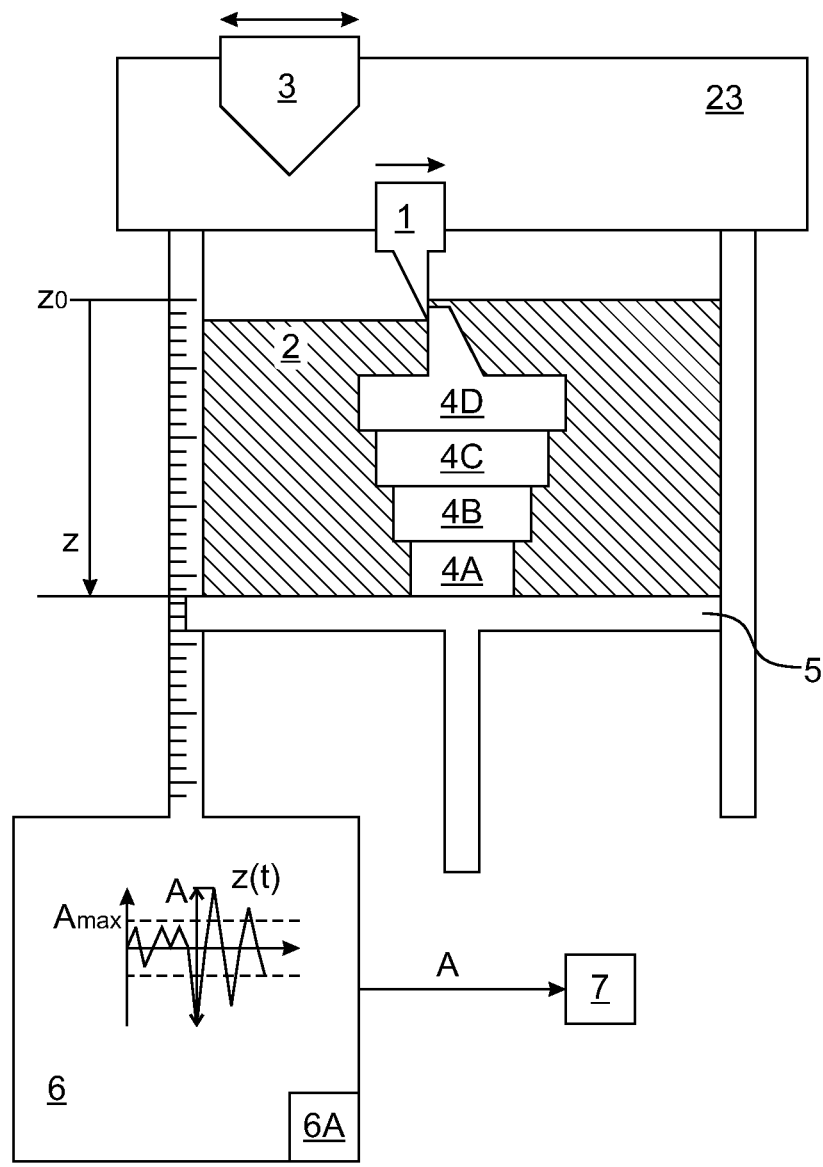

APPARATUS AND METHOD FOR GENERATIVE PRODUCTION OF A COMPONENT

BACKGROUND OF THE INVENTION

The present invention relates to an apparatus and a method for the generative production of a component, in particular a component of a gas turbine.

Known from WO 2009/013751 A2 is an apparatus for the generative production of a component, having a dispensing device in the form of a roller or a sliding blade for the disposal of a starting material layer, which is subsequently locally bonded in order to produce the component in layers. In order to sense a collision of the dispensing device with the component being produced during a movement of the dispensing device, the publication proposes an acceleration sensor or shock sensor on the dispensing device. WO 2012/045660 A1 proposes laser sensors for sensing obstacles that protrude from the starting material layer.

The known solutions thus disadvantageously necessitate additional apparatus expense, such as the aforementioned acceleration, shock, and laser sensors.

On the other hand, it is known in accordance with company-internal prior art to sense a position of a platform supporting the component being produced in a direction of layer buildup and, on the basis thereof, to control a displacement of the platform, in particular to control its height after a displacement step.

SUMMARY OF THE INVENTION

An object of an embodiment of the present invention is to improve a generative production of a component.

This object is achieved by the apparatus and method of the present invention. Advantageous embodiments of the invention are set forth in the claims.

In an embodiment of the present invention, the following steps are repeated multiple times: 1) disposal of the starting material layer by moving a dispensing device; 2) local bonding of this starting material layer to a cross section of the component being produced; and 3) displacement of a platform supporting the component being produced counter to a direction of layer buildup in order to produce the component in layers from the starting material.

Accordingly, an apparatus in accordance with an embodiment of the present invention has a movable dispensing device for disposing a starting material layer, a bonding device for local bonding of this starting material layer to a cross section of the component being produced, and a platform for supporting the component being produced, which can be displaced counter to a direction of layer buildup, particularly in a motor-driven manner.

In one embodiment, the starting material is a bulk material, in particular one that is powdery, pasty, or fluid, and, in particular, viscous. In one embodiment, the dispensing device has a starting material outlet orifice for application and/or a roller and/or sliding blade, in particular a doctor blade, for dispensing the starting material. In one embodiment, the dispensing device, in particular a motor-driven device, can move or is moved crosswise to the direction of layer buildup, which, in particular, can be at least substantially opposite to the direction of gravity.

In one embodiment, the starting material layer is bonded locally in an optical, thermal, or chemical manner to a cross section of the component being produced; in particular, it is fused (on) or sintered. Accordingly, in one embodiment, the bonding device has a laser for illuminating and/or heating the starting material layer.

According to one aspect of the present invention, the apparatus has a position sensing device for sensing a position of the platform, in particular in the direction of layer buildup and/or in relation to the dispensing device or bonding device or the guide thereof or, in particular for this purpose, a positionally fixed reference, and an interference sensing device for sensing whether the movement of the dispensing device is or is not free of interference on the basis of this sensed position. Accordingly, in one embodiment, a position of the platform, in particular in the direction of layer buildup and/or in relation to the dispensing device or bonding device or the guide thereof or, in particular for this purpose, a positionally fixed reference is sensed, and, on the basis of this sensed position of the platform, it is determined whether the movement of the dispensing device is or is not free of interference.

If, when it moves, the dispensing device for the disposal of the starting material layer unintentionally bumps against an obstacle that is supported on the platform in the direction of layer buildup, in particular against a protruding structure of the component being produced or a foreign body in the starting material layer, this causes the platform to move and, in particular, presses it counter to the direction of layer buildup. Through the sensing of a correspondingly deviating position of the platform, in particular, one counter to the direction of layer buildup and, in particular, in relation to the dispensing device or bonding device or the guide thereof or, in particular for this purpose, a positionally fixed reference, a collision of the dispensing device with the obstacle can thereby be sensed.

According to another aspect of the present invention, the apparatus has a position sensing device for sensing any change in the position of the platform, in particular over time and, in particular, for sensing a vibration, speed, or acceleration of the platform, in particular in the direction of layer buildup and/or in relation to the dispensing device or bonding device or the guide thereof or, in particular for this purpose, a positionally fixed reference, and an interference sensing device for sensing whether the movement of the dispensing device is or is not free of interference on the basis of this sensed change in position, in particular over time and, in particular, a vibration. Accordingly, in an embodiment of the invention, any change in the position of the platform, particularly over time, and, in particular, a vibration, speed, or acceleration of the platform, and/or, in particular, in the direction of layer buildup and/or in relation to the dispensing device or bonding device or the guide thereof or, in particular for this purpose, a positionally fixed reference is sensed, and, on the basis of this sensed change in position, particularly over time, in particular a vibration of the platform, it is determined whether the movement of the dispensing device is or is not free of interference.

If, when it moves, the dispensing device for the disposal of the starting material layer unintentionally bumps against an obstacle that is supported on the platform in the direction of layer buildup, in particular against a protruding structure of the component being produced or a foreign body in the starting material layer, this collision causes the platform to vibrate, in particular in the direction of layer buildup and/or in relation to the dispensing device or bonding device or the guide thereof or, in particular for this purpose, a reference that is positionally fixed. Through the sensing of a corresponding vibration of the platform, a collision of the dispensing device with the obstacle can thus be sensed.

In the following, a (change in) position of the platform in the direction of layer buildup in relation to the dispensing device or bonding device or the guide thereof or another positionally fixed reference, in particular in relation to the guide, is also referred to in short as a (change in) height of the platform without any limitation of generality. A change in position is understood in the present case for more compact illustration both, in particular, as a speed (dz/dt) or an acceleration ($d^2z/dt^2$) of the platform as well as, in more general terms, a sequence, in particular a temporal sequence z(t) or {z($t_1$), z($t_2$), ... } of positions z, particularly therefore a vibration of the platform. Accordingly, a change in position can be sensed, in particular, by sensing a plurality of positions at successive points in time.

As explained in the introduction, it is known in accordance with company-internal prior art, how to sense the position of the platform and, on the basis thereof, to control a displacement of the platform, in particular to control its height after a displacement step.

In one embodiment of the present invention, on the basis of the sensed (change in) position, in particular a (change in) height, of the platform, the displacement of the platform counter to the direction of layer buildup is governed on the one hand, in particular regulated and/or controlled, and, in addition, it is also sensed whether the movement of the dispensing device is or is not free of interference. Accordingly, in one embodiment, the position sensing device has a control device for governing, in particular regulating and/or controlling, the displacement of the platform counter to the direction of layer buildup on the basis of the sensed position or change in position.

In this way, it is possible in an advantageous manner to utilize a position sensing device that is already present for controlling the displacement of the platform, for an additional functionality and to sense a freedom from interference in the movement of the dispensing device without additional apparatus expense, such as the additional acceleration, shock, and laser sensors explained in the introduction.

In particular, in one embodiment, in order to sense a collision as soon as possible and to be able to respond to it quickly, the (change in) position is already sensed during the movement of the dispensing device. In doing so, a scanning frequency for the (change in) position of at least 0.5 kHz, particularly at least 0.9 kHz, preferably at least 5 kHz, and, more preferably, at least 9 kHz, has proven to be advantageous, particularly in order to sense a (freedom from) interference of movement of the dispensing device on the basis of a vibration of the platform.

In one embodiment, the (change in) position is sensed optically, in particular by an optical distance meter. Advantageously, this can reduce the design complexity and/or wear. In another embodiment, the (change in) position is sensed electrically, in particular by an electrical resistor, either capacitively or inductively. Advantageously, this can increase the precision and/or reduce the apparatus expense.

An interference in the movement of the dispensing device is then sensed in one embodiment when it is sensed that a parameter that depends on the sensed (change in) position lies outside of an admissible range. This includes also a sensing of no interference in the movement of the dispensing device in the case when it is sensed that a parameter that depends on the sensed (change in) position lies within an inadmissible range.

The parameter can be the (change in) position itself. In one embodiment, the parameter can include, in particular, a vibrational amplitude and/or a vibrational frequency of the change in position. In this way, it is possible to provide precise and quick collision sensing.

It can also be possible, in particular, to specify or alter the (in)admissible parameter range in order to be able to adapt advantageously to different ambient conditions, such as, for example, different process speeds, starting materials, or the like. Thus, for example, a higher movement speed of the dispensing device can bring about or induce other vibrational frequencies. In one embodiment, the (in)admissible parameter range will be or is determined beforehand empirically. As a result of this, it can be or is specified in a simple and precise way.

In one embodiment, a reaction or response is triggered when an interference of the movement of the dispensing device is sensed, in particular when the movement of the dispensing device is slowed or interrupted, when there is a deviating movement of the platform counter to the direction of layer buildup, and/or an alarm signal is emitted.

DESCRIPTION OF THE DRAWING FIGURE

Additional advantageous enhancements of the present invention ensue from the dependent claims and the following description of preferred embodiments. Shown, in part schematically, for this purpose is the following sole FIGURE:

FIG. 1 shows sensing of an interference during a generative production of a component in accordance with a method and by an apparatus according to an embodiment of the present invention.

DETAILED DESCRIPTION OF THE INVENTION

FIG. 1 shows an apparatus for the generative production of a component, having a movable dispensing device in the form of a sliding blade 1 for the disposal of a starting material layer 2, a movable bonding device in the form of a laser 3 for local bonding of this starting material layer to a cross section 4A, 4B, ... of the component being produced, and a platform 5 for supporting the component being produced, which can be lowered counter to a direction of layer buildup (from bottom to top in FIG. 1) in a motor-driven manner.

The apparatus has a position sensing device 6 for sensing a change in position z(t) of the position z of the platform over time in the direction of layer buildup in relation to a reference $z_0$, which is positionally fixed with respect to a guide 23 of the sliding blade and laser, by scanning the position of the platform in the direction of layer buildup at a scanning frequency of 1 or 10 kHz, for example. It is noted that the change in position(s) in relation to various references can be defined or sensed, whereby such a reference, as indicated in the exemplary embodiment, is preferably positionally fixed with respect to a guide of the dispensing device and/or bonding device, in particular to compensate for any movements of the entire apparatus with respect to the surroundings.

The position sensing device has a control device 6A for regulating and/or controlling the lowering of the platform.

The apparatus further has an interference sensing device 7 for sensing whether the movement of the dispensing device is or is not free of interference.

The position sensing device senses, during a movement of the dispensing device, a vibrational amplitude A of the change in position z(t) of the platform and transmits it to the interference sensing device.

If, during its movement for the disposal of the starting material layer, the dispensing device collides with an obstacle, as indicated in FIG. 1, such as, for example, a protruding structure of the component 4A, 4B, . . . , this causes the platform to vibrate in the direction of layer buildup, the vibrational amplitudes thereof lying outside of an empirically determined, adjustable admissible range [0; $A_{max}$].

Accordingly, in this case, the interference sensing device senses that the movement of the dispensing device is not (any longer) free of interference and triggers a response, such as, for example, a further lowering of the platform, a slowing or interruption of the movement of the dispensing device, and/or an alarm signal; a repeat of the dispensing operation can also possibly be triggered.

Even though exemplary embodiments were described in the preceding description, it is noted that a large number of modifications are possible. In addition, it is noted that the exemplary embodiments merely involve examples that are intended in no way to limit the protective scope, the applications, and the construction. Instead, the practitioner skilled in the art will be afforded a guideline by the preceding description for implementation of at least one of the exemplary embodiments by the above description, with it being possible to make diverse changes, in particular in regard to the function and arrangement of the components described, without departing from the protective scope, as it ensues from the claims and combinations of features equivalent to them.

What is claimed is:

1. A method for the generative production of a component, comprising the steps of:
   disposal of a material layer by movement of a dispensing device;
   local bonding of the material layer to a cross section of the component being produced; and
   displacement of a platform supporting the component being produced counter to a direction of layer buildup;
   sensing the position and change in position of the platform by scanning the position of the platform over time in the direction of layer build up;
   determining whether the movement of the dispensing device is not free of interference with the component being produced based on the sensed position or change in position of the platform in the direction of layer buildup; and
   triggering a response based on the determination of whether the movement of the dispensing device is not free of interference.

2. The method according to claim 1, wherein the position or change in position during the movement of the dispensing device is sensed.

3. The method according to claim 1, wherein the position or change in position is sensed at a scanning frequency of at least 0.5 kHz.

4. The method according to claim 1, wherein the position or change in position is sensed optically or electrically.

5. The method according to claim 1, wherein any interference in the movement of the dispensing device is sensed when it is sensed that a parameter that depends on the sensed position or change in position, is outside of an admissible range that can be specified and/or determined empirically beforehand.

6. The method according to claim 1, wherein a response is triggered when any interference in the movement of the dispensing device is sensed, the response selected from the group consisting of an interruption or slowing of the movement of the platform, a displacement of the platform, and an emitting of an alarm signal.

7. The method according to claim 1, wherein the displacement of the platform counter to the direction of layer buildup is regulated and/or controlled, on the basis of the sensed position or change in position.

8. An apparatus for the generative production of a component, comprising:
   a movable dispensing device configured for the disposal of a starting material layer;
   a bonding device configured for the local bonding of this starting material layer to a cross section of the component being produced;
   a platform configured for supporting the component being produced, which can be displaced counter to a direction of layer buildup;
   a position sensing device configured for sensing a position and change in position of the platform by scanning the position of the platform over time in the direction of layer buildup; and
   an interference sensing device configured for sensing whether the movement of the dispensing device is not free of interference with the component being produced on the basis of the sensed position or change in position of the platform, the interference sensing device configured and arranged to trigger a response based on the determination of whether the movement of the dispensing device is not free of interference.

9. The apparatus according to claim 8, wherein the position sensing device is configured for sensing the change in position during the movement of the dispensing device.

10. The apparatus according to claim 8, wherein the position sensing device configured for sensing the position or change in position is configured with a scanning frequency of at least 0.5 kHz.

11. The apparatus according to claim 8, wherein the position sensing device is configured for optical or electrical sensing of the position or change in position of the platform.

12. The apparatus according to claim 8, wherein the interference sensing device is configured to sense an interference of the movement of the dispensing device when it is sensed that a parameter that depends on the sensed position or change in position, lying outside of an admissible range that can be specified and/or determined empirically beforehand.

13. The apparatus according to claim 8, wherein the interference sensing device is configured to trigger a response of an interruption or slowing of movement, a displacement of the platform, and/or an emitting of an alarm signal when any interference in the movement of the dispensing device is sensed.

14. The apparatus according to claim 8, wherein the position sensing device has a control device for regulating and/or controlling, the displacement of the platform counter to the direction of layer buildup on the basis of the sensed position or change in position.

15. The apparatus of claim 8, wherein the bonding device is a laser.

* * * * *